No. 871,445. PATENTED NOV. 19, 1907.
A. ROBE.
HEATING DEVICE FOR BAKERS' OVENS.
APPLICATION FILED AUG. 10, 1905.
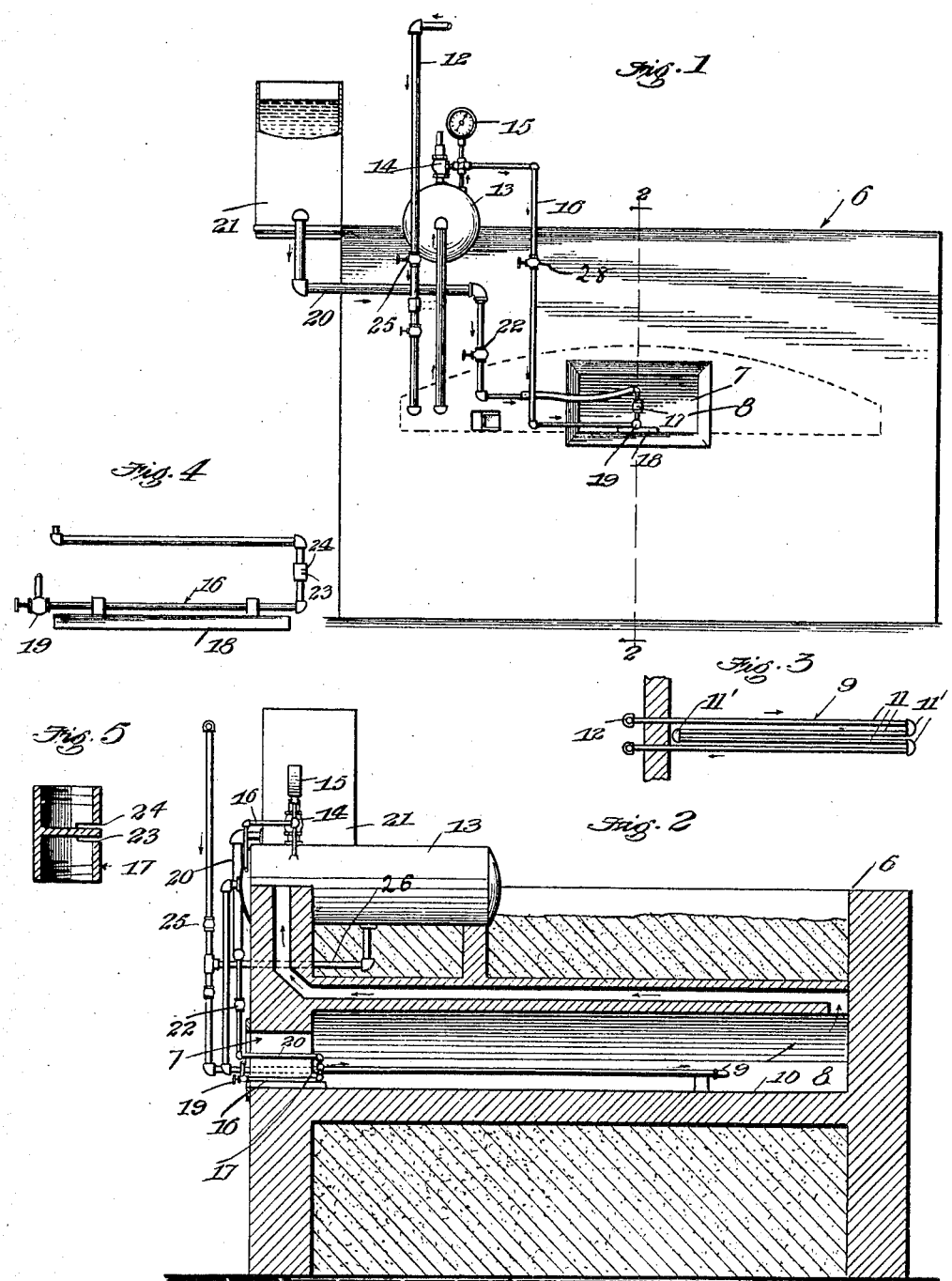

UNITED STATES PATENT OFFICE.

ARTHUR ROBE, OF CORONA, CALIFORNIA.

HEATING DEVICE FOR BAKERS' OVENS.

No. 871,445.  Specification of Letters Patent.  Patented Nov. 19, 1907.

Application filed August 10, 1905. Serial No. 273,690.

*To all whom it may concern:*

Be it known that I, ARTHUR ROBE, a citizen of the United States, residing at Corona, in the county of Riverside and State of California, have invented new and useful Improvements in Heating Devices for Bakers' Ovens, of which the following is a specification.

My invention relates to means for heating bakers' ovens in which liquid hydrocarbon is used in conjunction with steam for fuel; and the object thereof is to produce a device which when an oven is in use every day, shall keep stored therein a sufficient quantity of steam to start the burner at the beginning of the next day's work, or at any intermediate time. I accomplish this object by means of the device described herein and illustrated in the accompanying drawings in which:—

Figure 1— is a front elevation of a baker's oven with my apparatus attached thereto. Fig. 2— is a central vertical section of the oven taken on line 2—2 of Fig. 1. Fig. 3— is a detail plan of my steam generator. Fig. 4— is a side elevation of the burner. Fig. 5— is a longitudinal section through the burner tip.

Referring to the drawings 6 is a baker's oven of usual construction having the usual front opening or door 7. Located within the baking chamber 8 is my steam generating coil 9 which is raised slightly above the oven floor 10 and consists of a plurality of tubes 11 and bends 11'. This generating coil is connected at one end to a water supply pipe 12 and the other end is connected to the steam storage tank 13. This storage tank is provided with a safety valve 14 and a steam gage 15, and a connection is made from this storage tank by pipe 16 to the burner tip 17. A base 18 within the baking chamber supports the steam pipe 16, which pipe is provided with the regulating valve 19 to control the quantity of steam used. An oil supply pipe 20 is connected to the top of the burner tip and to the oil supply tank 21. This oil supply pipe has a regulating valve 22. The burner tip is provided with steam and oil outlets 23 and 24 and is loosely screwed to the oil and steam pipes so that with a pair of tongs the direction of the flame within the baking chamber can be changed at the will of the operator. Pipe 12 is provided with a valve 25 to control the flow of water therethrough and below said valve said pipe is connected by pipe 26 with the bottom of the storage tank. Pipe 16 is provided with a valve 28 to control the flow of steam to the burner.

When it is desired to heat the oven valve 25 is opened and the water is permitted to fill the coils and to about three-fourths fill the steam storage tank when the water is turned off. The generating coils are then heated in any desired manner until a sufficient amount of steam is generated and stored in tank 13 to atomize the liquid hydrocarbon fuel; the pressure gage 15 indicating when the necessary pressure is contained in the steam storage tank. Valves 22 and 28 are then opened to supply the required amount of liquid fuel and steam and the burner is lighted. The flame from the burner is first directed against coil 9 to increase the steam pressure and afterwards directed to other parts of the oven chamber until the same is heated sufficiently hot to bake whatever is desired to be baked in the oven.

From time to time as the water in the storage tank is converted into steam and before it is entirely used out of the tank a fresh supply of water is admitted into the tank by opening valve 25, it being the object to keep the tank from one-half to three-fourths full of water all the time. By this construction when an oven is used all day long there will be sufficient steam stored in the tank at the close of the day's work to provide the necessary steam for starting up the burner the next day without re-heating the coils by independent fuel as is done in starting, and also to start the burner at any intermediate time.

Having described my invention what I claim as new and desire to secure by Letters Patent is:—

In a baker's oven, an oven proper, a tank located outside of said oven, a water coil within the oven, water circulation pipes connecting the respective ends of the coil and the water tank, a valve located in one of said pipes, a water-supply pipe connected with the pipe last mentioned at a point between the valve and the tank, a valve in said water supply pipe, a base or holder adapted to rest on the floor of the oven, a steam pipe supported thereby and connected with the tank, an oil supply pipe, and a burner connected with said steam and oil pipes.

In witness that I claim the foregoing I have hereunto subscribed my name this 29th day of July, 1905.

ARTHUR ROBE.

Witnesses:
EDMUND A. STRAUSE,
HENRY T. HAZARD.